US012799909B2

(12) United States Patent
Kindracki et al.

(10) Patent No.: US 12,799,909 B2
(45) Date of Patent: Nov. 17, 2026

(54) LABORATORY STAND FOR STUDYING THE EFFECT OF ACCELERATION ON THE LINEAR BURNING RATE OF SOLID ROCKET PROPELLANTS

(71) Applicant: POLITECHNIKA WARSZAWSKA, Warsaw (PL)

(72) Inventors: Jan Kindracki, Grodzisk Mazowiecki (PL); Krzysztof Wacko, Tomaszów Lubelski (PL); Przemysław Woźniak, Warsaw (PL); Łukasz Mężyk, Warsaw (PL)

(73) Assignee: POLITECHNIKA WARSZAWSKA, Warsaw (PL)

( * ) Notice: Subject to any disclaimer, the term of this patent is extended or adjusted under 35 U.S.C. 154(b) by 345 days.

(21) Appl. No.: 18/720,216

(22) PCT Filed: Dec. 16, 2022

(86) PCT No.: PCT/PL2022/050094

§ 371 (c)(1),
(2) Date: Jun. 14, 2024

(87) PCT Pub. No.: WO2023/113628

PCT Pub. Date: Jun. 22, 2023

(65) Prior Publication Data

US 2025/0059935 A1 Feb. 20, 2025

(30) Foreign Application Priority Data

Dec. 17, 2021 (PL) ........................................ 439880

(51) Int. Cl.
*F02K 9/96* (2006.01)
*F02K 9/08* (2006.01)

(52) U.S. Cl.
CPC .................. *F02K 9/96* (2013.01); *F02K 9/08* (2013.01); *F05D 2260/12* (2013.01); *F05D 2260/83* (2013.01)

(58) Field of Classification Search
CPC .......... F02K 9/96; F02K 9/08; F05D 2260/12; F05D 2260/83; G01M 15/14
See application file for complete search history.

(56) References Cited

FOREIGN PATENT DOCUMENTS

| | | |
|---|---|---|
| CN | 102680240 A | 9/2012 |
| CN | 104019994 A | 9/2014 |

(Continued)

OTHER PUBLICATIONS

J. B. Anderson et al., "An Investigation of the Effect of Acceleration on the Burning Rate of Composite Propellants," AIAA Journal vol. 6 No. 2, Feb. 1968, California, U.S.A.

(Continued)

*Primary Examiner* — Stephen D Meier
*Assistant Examiner* — Quang X Nguyen
(74) *Attorney, Agent, or Firm* — Taro Yaguchi

(57) ABSTRACT

The subject of the invention is a laboratory stand for studying the effect of accelerations on the linear burning rate of solid rocket propellants.

Figure 1:
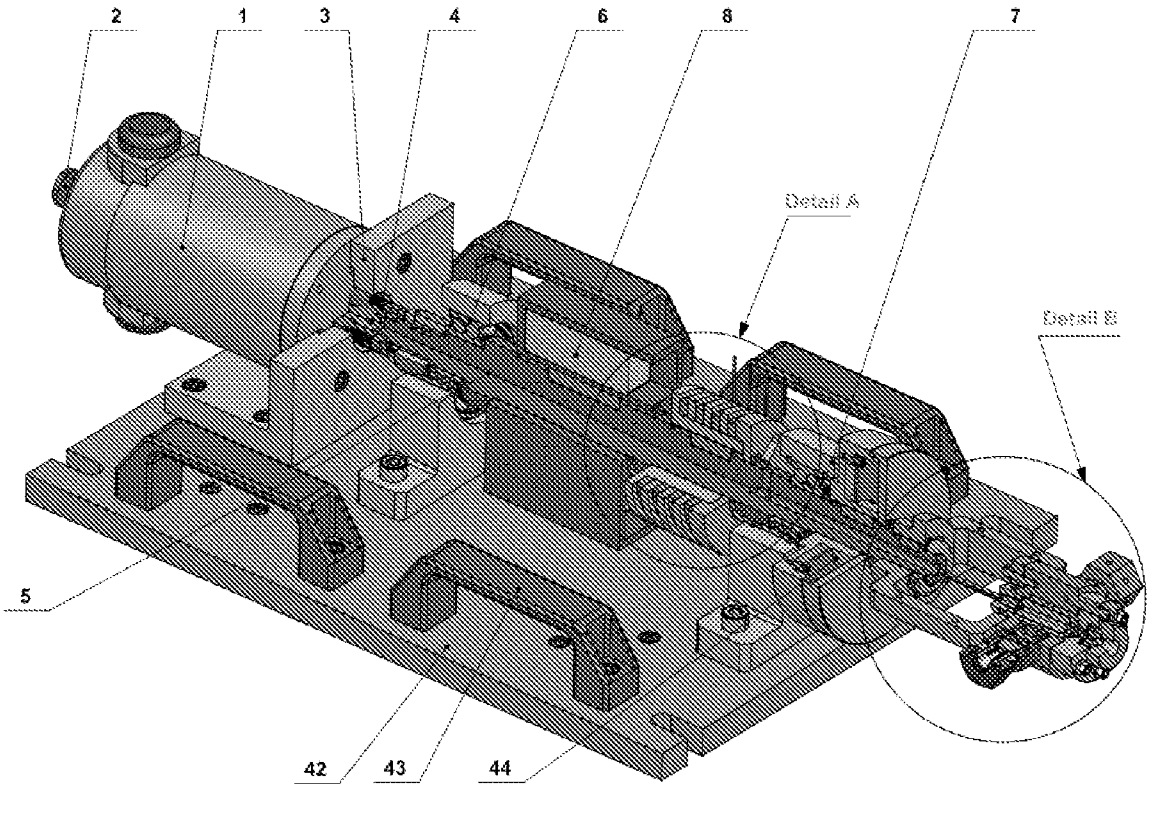

The laboratory stand for studying the effect of accelerations on the linear burning rate of solid rocket propellants according to the invention comprises a DC electric motor with an encoder, an energy storage module, an igniter power supply system, an electronic pressure measuring system in a combustion chamber and a rocket micromotor. The electric motor is connected to an encoder, at the same time the electric motor is connected to the main shaft by a bellows-free coupling, and an energy storage module is placed on the main shaft. On the opposite side of the rocket micromotor body located on the main shaft by a fastener there is the igniter power supply system mounted on the main shaft containing a power supply system sleeve on which conductive rings and insulating rings are placed, terminated with a closing ring and carbon brushes. The electronic pressure measuring system in the combustion chamber includes a pressure sensor located in a pressure sensor socket connected to the rocket micromotor body by means of a pressure measurement port. And, furthermore, on the threaded end of the main shaft is located a rocket micromotor body mount containing the combustion chamber with an internal collector groove and a pressure measurement port, and a safety valve port with a safety valve together with an outlet socket on the side of the rocket micromotor body.

15 Claims, 3 Drawing Sheets

(56) References Cited

FOREIGN PATENT DOCUMENTS

| | | | | | |
|---|---|---|---|---|---|
| CN | 109459242 | A | | 3/2019 | |
| CN | 109459242 | B | * | 4/2020 | ............ G01M 15/05 |
| CN | 113776842 | A | | 12/2021 | |
| JP | H11182347 | A | * | 7/1999 | |
| KR | 20190057614 | A | * | 5/2019 | .......... G01M 99/008 |

OTHER PUBLICATIONS

Melvin John Bulman, "The effect of Acceleration on the Burning Rate of Double Base Rocket Propellants," Ph.D. Thesis, U.S. Naval Postgraduate School, 1968, California, U.S.A.

Soe Hlaing Tun et al., "Star Grain Regression Under Spin Induced Acceleration Effect," Applied Mechanics and Materials, vols. 110-116, pp. 451-456, 2011 doi:10.4028/www.scientific.net/AMM.110-116.451, Switerland.

David R. Greatrix, "Assessing the Influence of Orientation Angle on Acceleration-Augmented Burning in Solid Rockets," AIAA, 2018, Toronto, Ontario, Canada.

* cited by examiner

LABORATORY STAND FOR STUDYING THE EFFECT OF ACCELERATION ON THE LINEAR BURNING RATE OF SOLID ROCKET PROPELLANTS

The subject of the invention is a laboratory stand for studying the effect of accelerations on the linear burning rate of solid rocket propellants.

So far, a review of the available literature has not revealed domestic solutions for studying the effect of accelerations (rotary motion) on the linear burning rate of solid rocket propellants.

From the publication by J. B. Anderson, R. E. Reichenbach, "An Investigation of the Effect of Acceleration on the Burning Rate of Composite Propellants", AIAA Journal Vol. 6 No. 2, February 1968, as well as from the publication by Melvin John Bulman, "The effect of Acceleration on the Burning Rate of Double Base Rocket Propellants," Ph.D. Thesis, U.S. Naval Postgraduate School, 1968, and the publication by Soc Hlaing Tun and Xiang Hong Jun, "Star Grain Regression Under Spin Induced Acceleration Effect," Applied Mechanics and Materials, Vols. 110-116, pp 451-456, 2011 doi: 10.4028/www.scientific.net/AMM.110-116.451, and also from the publication by David R. Greatrix, "Assessing the Influence of Orientation Angle on Acceleration-Augmented Burning in Solid Rockets", AIAA, 2018, the results of ongoing experimental studies and computer simulations of the effect of accelerations on the rate of burning of solid rocket propellants are known, but without disclosing details of the test stand design.

The laboratory stand for studying the effect of accelerations on the linear burning rate of solid rocket propellants according to the invention comprises a DC electric motor with an encoder, an energy storage module, an igniter power supply system, an electronic pressure measuring system in a combustion chamber and a rocket micromotor. The electric motor is connected to an encoder, at the same time the electric motor is connected to the main shaft by a bellows-free coupling, and an energy storage module is placed on the main shaft. On the opposite side of the rocket micromotor body located on the main shaft by a fastener there is the igniter power supply system seated on the main shaft containing a power supply system sleeve on which conductive rings and insulating rings are placed, ending with a closing ring and carbon brushes. The electronic pressure measuring system in the combustion chamber includes a pressure sensor located in a pressure sensor socket connected to the rocket micromotor body by a pressure measurement port. And furthermore, on the threaded end of the main shaft is provided a micromotor body mount containing a combustion chamber with an internal collector groove and a pressure measurement port, and a safety valve port with a safety valve along with an outlet socket on the side of the rocket micromotor body.

Preferably, the electric motor is frontally connected to the electric motor mount.

Preferably, the main shaft is supported on a first bearing unit and a second bearing unit.

It is preferred, when the first bearing unit includes a double-row angular ball bearing housed in a housing attached to the stand base.

It is preferred, when the second bearing unit comprises a double-row angular ball bearing immobilized in the housing by two internal spring-loaded circlips.

It is preferred, when two lithium-polymer energy storage batteries are arranged symmetrically on both sides of the main shaft.

Preferably, the power supply system sleeve contains four conductive rings and three insulating rings.

Preferably, carbon brushes are located in the socket in contact with the conductive rings by means of a spring clamping system located in the socket.

Preferably, the socket is located on the power supply system base.

Preferably, the rocket micromotor body is connected to the mount via six threaded rods with nuts.

Preferably, the pressure sensor socket has a cavity for a pressure sensor insert and a filter, a distance sleeve closed by a clamping nut.

Preferably, the safety valve has a safety membrane.

Preferably, the outlet socket contains a nozzle insert positioned in the pressure.

It is preferred, when between the nozzle insert and the nozzle socket is a membrane.

Preferably, the igniter power supply system contains an electric primer and a disk-shaped gunpowder lozenge placed in a housing sealed with an o-ring.

The designed test stand makes it possible to carry out experimental tests to determine the effect of accelerations acting on a solid propellant placed in a combustion chamber of a rocket micromotor on the relationship between linear burning rate and pressure in the combustion chamber. In addition, it is possible to determine a change in performance of a tested motor resulting from pressure change in the combustion chamber due to the presence of centrifugal acceleration. This is an important issue in the context of the application of rocket motors, regardless of whether this constitutes the main drive or auxiliary or control motors. During flight, a rocket missile is subjected to accelerations of a significant g value (with respect to the gravitational acceleration). During the accelerated or spinning flight of an object in which a solid propellant motor is installed, the grain burning rate of the solid propellant changes with the value of this acceleration. Since the linear burning rate is the basic parameter describing the properties of solid rocket propellants, knowledge of the effect of acceleration on this value, allows to determine the limits of the safety of operation of the combustion chamber (maximum operating pressure), changes in the thrust profile of the motor over time, the consequence of which can be changes in the range or altitude of the flight of an object powered by a solid propellant rocket motor.

The following technical means were used in the solution:

- a laboratory rocket micromotor-attached to the end of the drive shaft, allowing to carry out experimental combustion of a test sample to determine the linear burning rate of solid rocket propellant under the conditions of a known value of acceleration acting on the propellant grain;
- an electric drive in the form of a DC electric motor (together with an encoder—to measure the rotational speed), the purpose of which is to generate an appropriate value of acceleration in the form of centrifugal acceleration (obtained by setting the appropriate value of the rotational speed of the tested micromotor);
- a system for measuring pressure in a combustion chamber by the use of a pressure sensor together with an amplifier system and data recording on a memory card—the system allows pressure measurement at a frequency of 2 kHz during the action of acceleration affecting the grain of solid rocket propellant;
- an igniter control system and measurement of its electrical parameters during operation;

a measurement card together with dedicated software for measurement data acquisition.

Several component systems can be distinguished in the design of the test stand:

- a drive module—an electric motor with an encoder, rotating the rocket micromotor by the main shaft;
- two bearing supports of the main shaft (one of the supports allows compensation of assembly errors of the shaft);
- an energy storage module (to supply the pressure measuring system in the combustion chamber);
- a three-channel igniter power supply system consisting of an ignition unit and a gunpowder igniter;
- a laboratory rocket micromotor together with a necessary mechanical interface mounted on the end of the shaft.

The following indicates the next steps carried out during the operation of the test stand:

- installation of the appropriate nozzle membrane (nozzle plug) and safety membrane;
- activation of electronic measuring systems (measuring card, combustion chamber pressure measuring system);
- placing the tested sample of propellant in the combustion chamber;
- placing the igniter in the corresponding socket of the rocket micromotor body;
- setting the desired acceleration (setting the appropriate rotating speed of the driving DC electric motor-controlling the value of the supply power voltage);
- starting the measurement system and the data acquisition program (pressing the READY button in the data acquisition program-transition into the standby state), activating the ignition system (unlocking the safety button);
- conducting the experiment (the use of the measurement card for automatic start the driving electric motor, then after a few seconds start of the ignition initiation system, and after the expiration of a pre-programmed time, automatic recording of measurement data in the computer-all data except the pressure in the combustion chamber);
- deactivation of the ignition initiation system (pressing the safety button and the STOP button in the data acquisition program); transfer of the chamber pressure measurement data from the memory card to the computer memory;
- carrying out operational steps (dismantling of the igniter, cleaning of the combustion chamber, cleaning of the outlet nozzle, replacement of the nozzle membrane).

Figure 2:
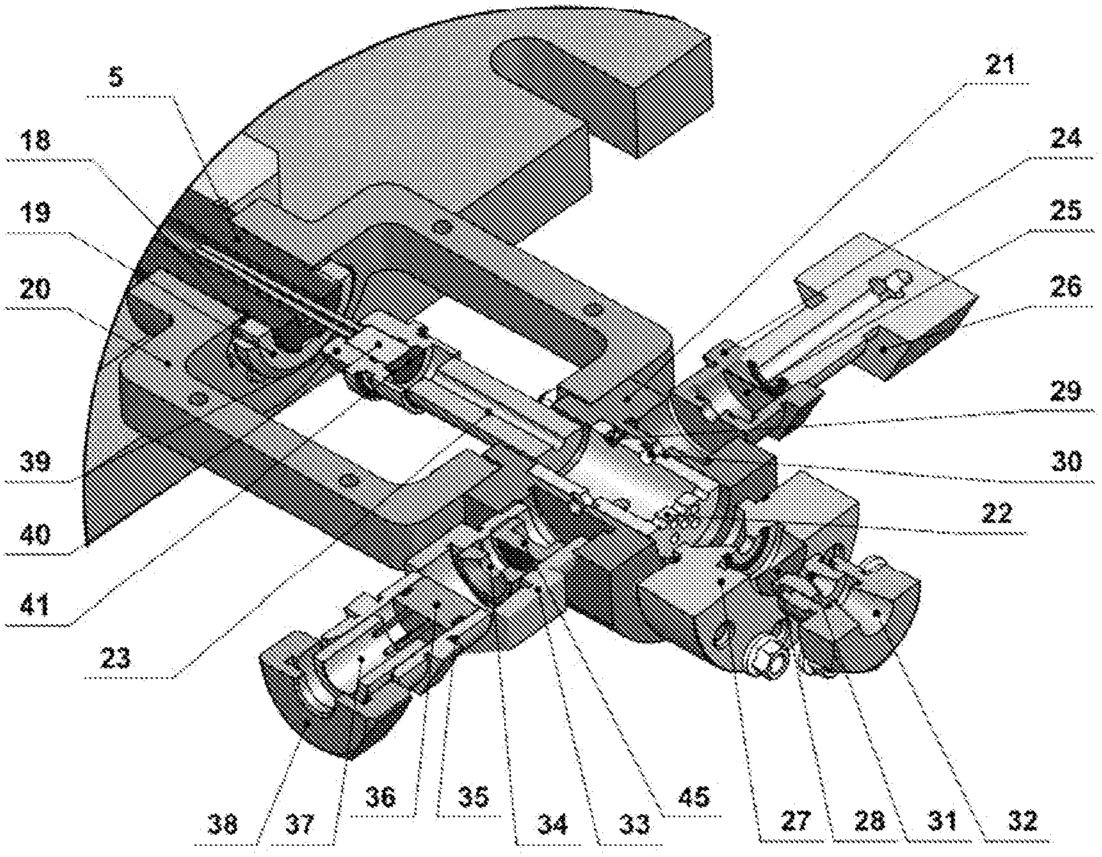
Figure 3:
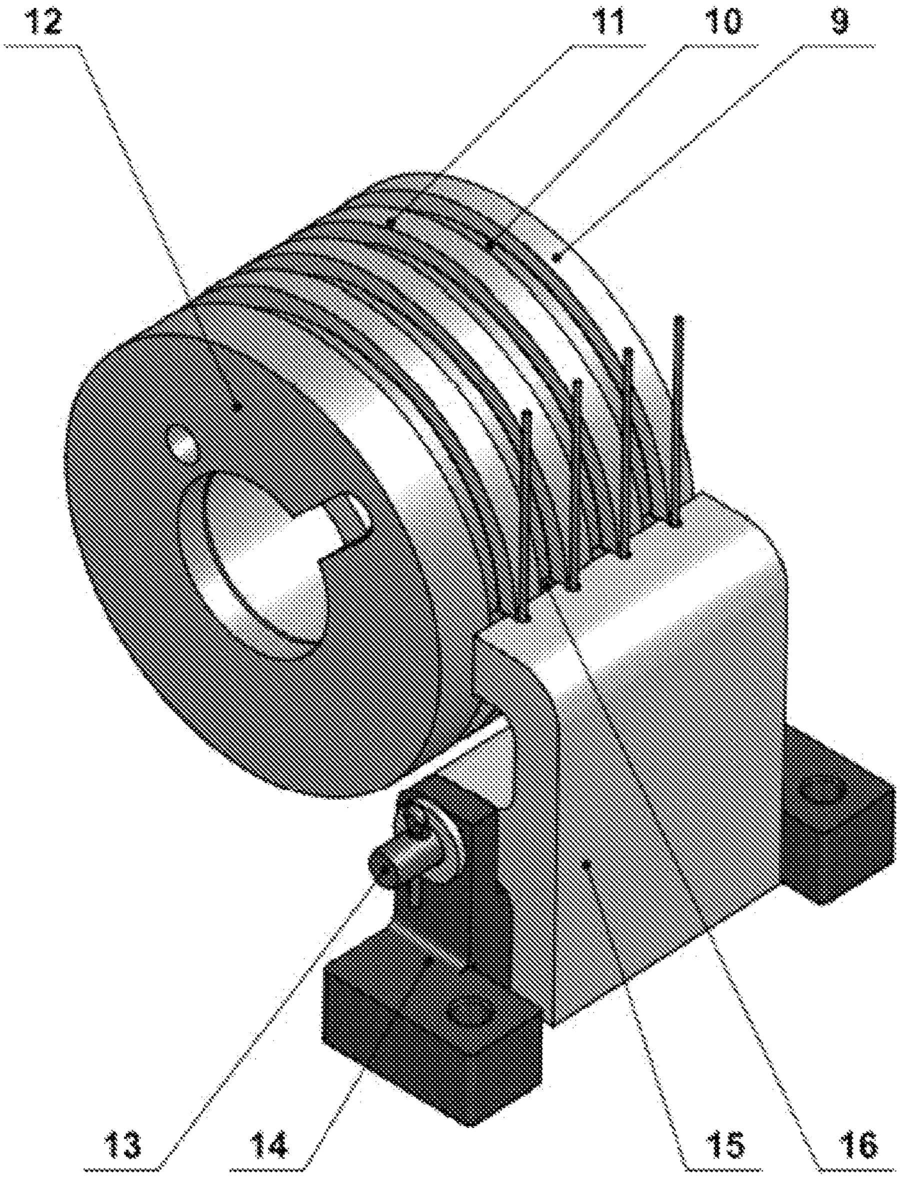

The object of the invention in an embodiment is shown on the drawing, in which:

FIG. 1 shows a three-quarter view in axonometric projection with cutaway of one-quarter of the body, FIG. 2 shows a detailed view of the laboratory rocket micromotor (exploded view), and FIG. 3 shows a detail view of the igniter power supply system.

EMBODIMENT

The subject of the invention is a laboratory stand for studying the effect of acceleration on the linear burning rate of a solid rocket propellant sample and on the pressure in the combustion chamber. The test stand makes it possible to determine the effect of acceleration on the nature of the relationship between burning rate and chamber pressure (constant, linear, etc.) and on changes in the performance of the rocket motor under test resulting from changes of pressure in the combustion chamber due to the occurrence of centrifugal acceleration.

The laboratory stand for studying the effect of acceleration on the linear burning rate of solid rocket propellants according to the invention is designed to determine the effect of acceleration on the nature of the relationship between the linear burning rate and the pressure in the combustion chamber, as well as on the changes in the performance of the tested rocket micromotor resulting from the change of pressure in the chamber caused by the occurrence of centrifugal acceleration (rocket micromotor put into rotary motion).

The invention includes several basic parts, including an electric drive module, two bearing shaft supports, an energy storage module, an igniter power supply system, a electronic pressure measuring system in the combustion chamber, and a laboratory rocket micromotor (equipped with a suitable mechanical interface connecting it to the main shaft end of the main stand).

The electric drive module contains an electric motor (1) supplied with a constant voltage in the range of 6-27 V, along with an attached encoder (2) for determining the rotating speed of the electric motor. The electric motor (1) is frontally connected with an angle-shaped mount (3) of electric motor by a set of 4 hexagon-socket cap screws. The electric motor mount (3) was fixed to the stand base (42) by a set of 4 Allen screws. There are also 4 handles (43) bolted to the stand base (42) to facilitate easy handling of the assembled stand. An important component of the drive module is the main shaft (5), which is connected to the electric motor (1) by means of a bellows (backlash-free) coupling (4), which compensates possible shaft misalignment errors and cushions vibrations from uneven weight distribution in the rotating system.

The main shaft was supported in two places with a first bearing unit (6) and a second bearing unit (7). The first bearing unit (6) contains a double-row angular ball bearing loosely placed in a mounting, which was placed in a housing that simultaneously serves as a component mounting the first bearing unit to the stand base (42). The second bearing unit (7) is an almost identical set, the only difference consists in that the bearing has been immobilized in the mounting by means of two internal spring-loaded circlips. The adopted bearing configuration is as follows: the bearing of the first bearing unit-floating, the bearing of the second bearing unit-locating.

Another component installed on the main shaft (5) is an energy storage module (8) used as a power source of the electronic pressure measuring system in the combustion chamber (44). The energy storage module (8) contains two lithium-polymer batteries, symmetrically arranged on both sides of the main shaft (5), enclosed in a housing.

The energy storage module (8) is seated on the shaft, the rotation relative to the shaft axis is blocked by a parallel key, while longitudinal movement was prevented by an external circlip. The supply lines between the energy storage module (8) and the pressure measuring system were routed through a specially hollowed hole inside the shaft. Such routing of the cables allows the drive shaft to rotate freely.

The three-channel igniter power supply system (B) (shown in FIG. 3) includes power supply system sleeves (9), on which four conductive (slip) rings (10) and three insulating rings (11) are alternately placed, the whole being terminated with a closing ring (12).

Three conductive rings (10) are used to transfer 3 independent positive pole power channels, while the fourth conductive ring (10) is the common ground of the power channels. Such arrangement makes it possible to power as many as three, independent igniter modules. Components of the igniter power supply system (B) are seated on the shaft (5), the rotational movement is blocked by a parallel key, while the longitudinal movement is blocked by an external circlip. The elements transferring power to the three-channel igniter power supply system (B) are 4 carbon brushes (16), located in a socket (15), which are in contact with conductive rings (10). The carbon brushes socket is mounted on the power supply system base (14) and a pin (13), locked on both sides of the base (14) with a pin, is passed through it, allowing lateral movement with respect to the axis of the shaft (5). The system of pressing the carbon brushes against the conductive rings is based on the use of springs, located in the socket (15) and the whole is pressed by means of the set screw (17) with a ball, screwed into the corresponding wall of the base (14), where the surface of the ball is in contact with the housing of the carbon brush sockets. The power supply (14) system base was fixed to the stand base (42) with 2 hexagon-socket cap screws. An electrical wire was soldered on the inner surface of each conductive ring (10). The resulting wire bundle was routed out to the vicinity of the face of the shaft/shaft end (5) successively through the face hole of the closing ring (12), the transverse hole of the shaft relative to its axis, and through the face hole hollowed in the shaft (5).

The electronic pressure measuring system (44) in the combustion chamber includes a pressure sensor (36), located in the socket (35) connected to the rocket micromotor (A) body (21) through a special port (33), a circuit for normalizing and amplifying the measurement signal to typical 0-10 V analog voltage, and a circuit for supplying the measurement sensor. The whole system was built on a common circular-shaped PCB with a central hole, placed and enclosed in a housing. The housing of the measuring system was mounted on the shaft with a keyed connection and an external circlip.

On the threaded end of the shaft (5) was placed a prismatic key-locked mount (20) of the rocket micromotor body, bearing lock washer MB3 (18), and then the whole was tightened with bearing lock nut KM3 (19). The central part of the laboratory rocket micromotor (A) (shown in detail in FIG. 2) is the rocket micromotor (A) body (21) connected to the mount (20) with six threaded rods, tightened with nuts. Such number of rods ensures adequate strength of the structural connection.

The combustion chamber (22) was placed in the body, along with a grain (23) of solid rocket propellant. The use of a combustion chamber (22) in the shape of a "basket", terminated with an integral grate and having three threaded holes (M3 metric thread) on the side walls, used for pressurized screwing of the set screws (29), ensures that the central position of the grain (23) of propellant is maintained at the beginning of the experiment, which facilitates the ignition process over the entire available surface of the grain. The use of a grate with an appropriately selected number of through-holes in relation to the cross-section of the critical diameter of the nozzle, prevents the dangerous phenomenon of clogging of the outlet nozzle by a detached piece of grain and the consequent destruction of the test stand. In addition, the combustion chamber (22) is equipped with an external collector groove (30) for collecting exhaust gases and delivering them to the rocket micromotor body (21), followed by a pressure measurement port (33) and a safety valve port (24) and an exhaust gas dispersing tip (26).

The rocket micromotor (A) body (21) is equipped with a threaded pressure measurement port (33), into which a pressure sensor socket (35) having a cavity for a special insert (34) and a dumper (45) was screwed, task of which consists in reducing the flow of solid particles of combustion products hitting into the surface of a sensor membrane (35), while maintaining the appropriate conditions for reliable measurement of pressure in the combustion chamber. The pressure sensor (36), a distance sleeve (37) made of polyamide were placed in the socket (35), and then the whole was closed with a clamping nut (38). The sleeve (37) used prevents the pressure sensor from moving along the axis of the socket (35). The shape of the insert (34) is related to the manufacturer's recommendations concerning to assembly of the pressure sensor used.

The body is also equipped with a safety valve (26), with a replaceable pressure plate (25), which valve is screwed into the safety valve port (24). The plate located in the safety valve, in the event of exceeding the specified permissible pressure, breaks, in effect opening an additional vent, thus reducing the pressure in the combustion chamber. The bleed system used counteracts the possibility of destroying the test stand.

On one side of the rocket micromotor (A) body (21), the outlet nozzle socket (27) was installed by sliding it onto threaded rods, screwed into the rocket micromotor (A) body (21), and then tightened with nuts. A replaceable nozzle insert (31) is mounted in a special clamp (32), sealed with a Viton® O-ring. The nozzle section thus prepared is screwed into the outlet nozzle socket (27). The space between the nozzle insert (31) and the nozzle socket (27) provides an attachment plane for the membrane (28), which acts as a nozzle plug. The purpose of this plug is to maintain the correct pressure value in the combustion chamber at the time of initiating the combustion process, which greatly facilitates the start-up of the combustion chamber and contributes to increasing the accuracy of combustion time measurement. In the case of low pressures in the combustion chamber, the plug (28) allows the rocket micromotor (A) to start. Proper selection of the nozzle plug allows reducing the pressure build-up time in the motor chamber (22), improving the ignition characteristics, which in turn has a key effect on the subsequent combustion process and rocket motor performance.

On the opposite side of the rocket micromotor (A) body (21) there is an igniter section, whose task is to initiate the combustion process in the shortest possible time and in a reproducible manner in subsequent experiments. According to the invention, the following was used to initiate ignition: an electric primer (40) and a black powder bed in the form of a compressed disk-shaped lozenge (41) placed in a housing (39) (the design of the igniter was developed in a way that allows the use of black powder also in ground form). Thus prepared igniter, having an external metric thread, a Viton® O-ring seal and a hexagonal head to facilitate tightening, was mounted in the rocket micromotor (A) body (21). Due to the use of the use of an interchangeable igniter housing (39), it is possible to use several types of igniter (40) differing in geometric dimensions.

The tightness of the connection between the key components of the laboratory rocket micromotor (A) (sections of: igniter, nozzle, pressure bleed in the chamber and pressure measurement) was achieved by using O-ring seals made of Viton®.

| List of cross-reference designations | |
|---|---|
| A | Rocket micromotor |
| B | Igniter power supply system |
| 1 | DC electric motor |
| 2 | Encoder |
| 3 | Electric motor mount |
| 4 | Bellows (backlash-free) coupling |
| 5 | Main shaft |
| 6 | First bearing unit |
| 7 | Second bearing unit |
| 8 | Energy storage module (battery) |
| 9 | Power supply system sleeve |
| 10 | Conductive ring |
| 11 | Insulating ring |
| 12 | Closing ring |
| 13 | Pin |
| 14 | Power supply system base |
| 15 | Carbon brush socket |
| 16 | Carbon brush |
| 17 | Set screw with ball |
| 18 | Bearing lock washer MB3 |
| 19 | Bearing lock nut KM3 |
| 20 | Body mount |
| 21 | Micromotor body |
| 22 | Combustion chamber (basket) with grate |
| 23 | Grain-propellant |
| 24 | Safety valve port |
| 25 | Pressure plate |
| 26 | Safety valve |
| 27 | Outlet nozzle socket |
| 28 | Nozzle membrane |
| 29 | Set screw |
| 30 | Collector groove |
| 31 | Nozzle insert |
| 32 | Outlet nozzle clamp |
| 33 | Pressure measurement port |
| 34 | Pressure sensor insert |
| 35 | Pressure sensor socket |
| 36 | Pressure sensor |
| 37 | Distance sleeve |
| 38 | Pressure sensor clamping nut |
| 39 | Igniter housing |
| 40 | Electric primer |
| 41 | Gunpowder lozenge |
| 42 | Stand base |
| 43 | Handle |
| 44 | Electronic pressure measuring system in the combustion chamber |
| 45 | Filter |

The invention claimed is:

1. A laboratory stand for studying the effect of accelerations on the linear burning rate of solid rocket propellants comprising a DC electric motor (1) with an encoder (2), an energy storage module (8), an igniter power supply system (B), an electronic pressure measuring system (44) in a combustion chamber (22) and a solid rocket micromotor (A), characterized in that:

the electric motor (1) is connected to the encoder (2), at the same time the electric motor is connected to a main shaft (5) by a bellows coupling (4), and an energy storage module (8) is placed on the main shaft (5), on the opposite side of the solid rocket micromotor (A) body (21) located on the main shaft (5) by a fastener (20) there is an igniter power supply system (B) mounted on the main shaft (5) comprising a power supply system sleeve (9) on which conductive rings (10) and insulating rings (11) are placed, terminated with a closing ring (12) and carbon brushes (16), the electronic pressure measuring system (44) in the combustion chamber includes a pressure sensor (36) located in a pressure sensor (36) socket (35) connected to the solid rocket micromotor (A) body (21) by means of a pressure measurement port (33), and, in addition, on the threaded end of the main shaft (5) there is a solid rocket micromotor (A) body (21) mount (20) containing the combustion chamber (22) with an internal collector groove (30) and the pressure measurement port (33) and a safety valve port (24) with a safety valve (26) together with an outlet socket (27) on the side of the solid rocket micromotor (A) body (21).

2. The laboratory stand according to claim 1, characterized in that the electric motor (1) is frontally connected to a mount (3) of the electric motor (1).

3. The laboratory stand according to claim 1, characterized in that the main shaft (5) is supported on a first bearing unit (6) and a second bearing unit (7).

4. The laboratory stand according to claim 3, characterized in that the first bearing unit (6) contains a double-row angular ball bearing housed in a housing attached to a stand base (42).

5. The laboratory stand according to claim 3, characterized in that the second bearing unit (7) comprises the double-row angular ball bearing immobilized in the housing by two internal spring-loaded circlips.

6. The laboratory stand according to claim 1, characterized in that on both sides of the main shaft (5) there are symmetrically arranged two lithium-polymer batteries of energy storage (8).

7. The laboratory stand according to claim 1, characterized in that the power supply system sleeve (9) contains four conductive rings (10) and three insulating rings (11).

8. The laboratory stand according to claim 1, characterized in that the carbon brushes (16) are located in a socket (15) in contact with the conductive rings (10) by means of a spring clamping system located in the socket (15).

9. The laboratory stand according to claim 1, characterized in that a socket (15) is located on a power supply system base (14).

10. The laboratory stand according to claim 1, characterized in that the solid rocket micromotor (A) body (21) is connected to the mount (20) by six threaded rods with nuts.

11. The laboratory stand according to claim 1, characterized in that the pressure sensor (36) socket (35) has a cavity for the pressure sensor (36) insert (34) and a filter (45), a distance sleeve (37) closed by a clamping nut (38).

12. The laboratory stand according to claim 1, characterized in that the safety valve (26) has a safety membrane (25).

13. The laboratory stand according to claim 1, characterized in that the outlet socket (27) contains a nozzle insert (31) located in a clamp (32).

14. The laboratory stand according to claim 1, characterized in that a membrane (28) is located between the nozzle insert (31) and the nozzle socket (27).

15. The laboratory stand according to claim 1, characterized in that the igniter power supply system (B) contains an electric primer (40) and a disk-shaped gunpowder lozenge (41) housed in a housing (39) sealed with an o-ring.

* * * * *